Aug. 5, 1958
F. W. SAMPSON
2,845,810
STEERING WHEEL
Filed Dec. 15, 1954
2 Sheets-Sheet 1
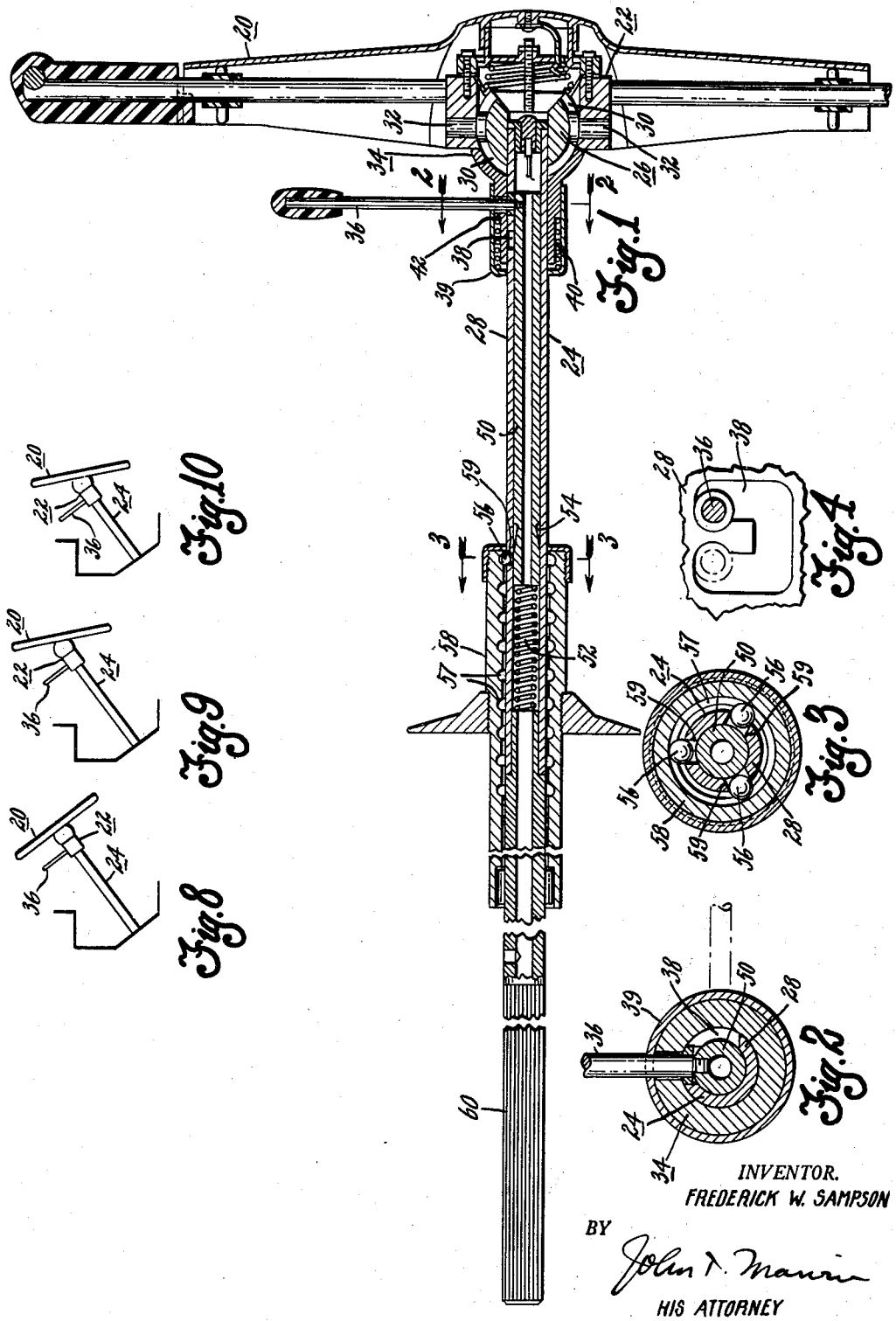
INVENTOR.
FREDERICK W. SAMPSON
BY
John T. Marvin
HIS ATTORNEY

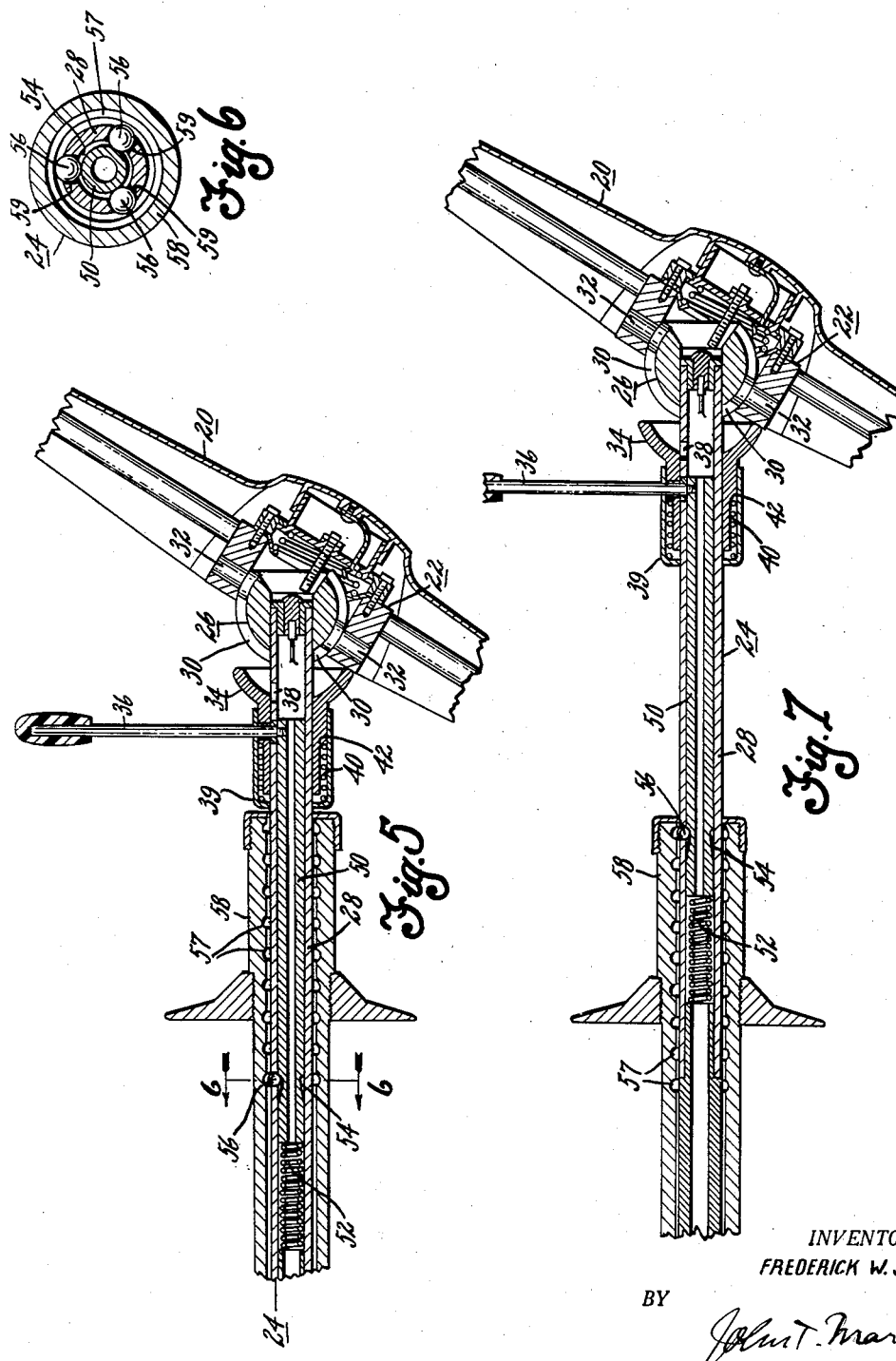

United States Patent Office 2,845,810
Patented Aug. 5, 1958

2,845,810

STEERING WHEEL

Frederick W. Sampson, Dayton, Ohio, assignor to General Motors Corporation, Detroit, Mich., a corporation of Delaware Application December 15, 1954, Serial No. 475,392

3 Claims. (Cl. 74—493)

This invention relates to steering wheels and is particularly concerned with adjustable steering wheels for vehicles and the like.

One of the objects of the invention is to provide a steering wheel assembly which is adjustable with respect to the steering column and also with respect to the position of the steering wheel relative to the support for the steering column.

It is a further object of the invention to provide a steering wheel assembly wherein the steering wheel may be shifted out of the plane of its normal driving position relative to the steering column to another position for facilitating entry and exit of the driver from the vehicle and wherein the entire steering assembly may be translated to a more remote position through movement of the steering column.

Another object of the invention is to provide a steering wheel assembly wherein the steering wheel is carried on a ball joint arrangement at one extremity of the steering column and wherein a locking arrangement is provided for positively holding the wheel in a given plane, for example at 90° to the axis of the steering column, which locking arrangement may be released to permit the wheel to assume a position in a plane out of normal with the axis of the steering column, said locking arrangement simultaneously releasing the steering column so that the column may be moved inwardly without disengaging the steering mechanism.

In automotive vehicles there has been a need for a steering wheel assembly which is sufficiently flexible to permit easy entry and exit of the driver from the driver's seat. Many persons prefer driving in a vehicle with the wheel in close proximity to the body; this position makes entry and exit into and out of the vehicle difficult and often necessitates changes in the position of the driver's seat.

The present invention is directed to a steering wheel assembly wherein the wheel is in its normal position during driving and wherein a locking arrangement is provided that may be released by the driver so that the wheel may be shifted about the steering column to a position, for example substantially parallel to the dashboard of the vehicle. At the same time the locking arrangement releases the steering column so that it may be translatably moved inwardly toward the dashboard to increase the distance between the steering wheel and the driver. The reversal of these functions will bring the wheel back to normal driving position with the locking means in engagement.

Further objects and advantages of the present invention will be apparent from the following description, reference being had to the accompanying drawings, wherein a preferred form of the invention is clearly shown.

In the drawings:

Figure 1 is a view in section of a steering wheel assembly showing the pivotal connection of the steering wheel to the steering column together with the internal arrangements of the steering column;

Figure 2 is a section taken on line 2—2 of Figure 1 showing the locking lever arrangement;

Figure 3 is a section taken on line 3—3 of Figure 1 showing the ball locking arrangement used in connection with the steering column in one position, namely the locked position;

Figure 4 is a fragmentary view showing the guide slot for the locking lever with the lever shown in one position in section and in the other position in dotted lines;

Figure 5 is a view in section of the steering wheel assembly with the steering wheel in unlocked position and the steering column in its inward position;

Figure 6 is a section taken on line 6—6 of Figure 5 showing the ball locking mechanism in the opposite position to that shown in Figure 3, namely the unlocked position;

Figure 7 is a view in section of the steering wheel assembly with the wheel in unlocked position and the steering column in forward position;

Figure 8 is a diagrammatic view showing the steering wheel as noted in Figure 1 in relation to a dashboard of an automotive vehicle;

Figure 9 is a diagrammatic view of the steering wheel in the position noted in Figure 7 with respect to the dashboard of an automotive vehicle; and Figure 10 is a diagrammatic view showing the steering wheel in the position shown in Figure 5 with respect to the dashboard of an automotive vehicle.

As previously stated, it is highly desirable to have a steering wheel assembly that is displaceable to a remote position when desired to facilitate the exit and entry of the driver of a car and which may be reestablished in its operative position without adjustment or complicated manipulation. The present invention is directed to such a structure wherein a steering wheel is noted at 20 of Figure 1, which wheel includes a hub portion 22 that connects to a steering column assembly 24. The hub portion 22 of the wheel includes a ball 26 that is fixedly positioned to the upper end of a tubular member 28 which is a portion of the steering column. The ball 26 includes two opposed peripheral slots 30 therearound in which a pair of lugs 32 ride. The lugs 32 are held in a portion of the hub 22 which is fixedly positioned to the wheel 20. Thus the wheel 20 may be pivoted around the ball 26 as limited by the lugs 32 and cooperating slots 30. The wheel is always maintained in operative engagement with the steering column through the lugs 32 and grooves 30 whereby the wheel is non-rotatable with respect to the steering column 24. This is a safety factor which, even though the wheel is in its unlocked position as will be described hereinafter, the steering engagement will be maintained.

In order to hold the wheel at substantially right angles to the steering column 24, a receiving cup or socket 34 is provided which is journaled on the tubular member 28. The socket 34 receives the lower end of the ball 26 in one position as noted in Figure 1 whereby the wheel is maintained at substantially a right angle to the axle of the steering column or at any other desired angle as predetermined by the construction of the assembly through contact of the socket 34 with hub 22. In order to maintain this position, a locking lever 36 is provided which passes through a C-shaped slot 38 in sleeve 28 noted in Figure 4. In the locked position the lever 36 is in the position shown in Figure 4 and is held in this position through the spring 40 which engages the lower end of a cup-shaped member 39 and is held in engagement therewith through a shoulder 42 which is associated with the socket member 34. When it is desired to release the wheel, the lever 36 is moved through the slot 38 as noted in Figure 4 to a position noted in Figure 5. In this position the socket 34 is moved away from the wheel which permits the wheel to pivot on the ball 26 through the sliding movement of lugs 32 in grooves 30. It will be noted that the slot 138 is C-shaped and is formed in the sleeve 28. The locking lever 36, on the other hand, is carried by the central shaft 50 which shaft is held in an upward position through a spring 52. When the lever 36 is in the lower position in slot 38 the spring 52 is depressed and the shaft 50 may be moved downwardly until an annular groove 54 thereon is in alignment with balls 56 that are partially carried by a member 58. This is explained as follows: In the upper position of the steering shaft the balls prevent axial movement thereof due to the fact that they are half engaged in one of the grooves 57 in member 58 and half engaged in the holes 59 in sleeve 28. This position of the balls is shown in Figure 3. When the shaft 50 is depressed, however, the groove 54 is in alignment with the balls 56, the balls 56 may move inwardly into groove 54 as noted in Figure 6 to release the engagement between the sleeve 28 and the member 58. In this position the entire shaft may be moved axially inwardly to a position noted in Figure 5. This does not disrupt the steering connection since an elongated spline 60 is provided at the end of the steering column which engages a steering mechanism and maintains the engagement whether the shaft is in the normal driving or depressed position. In other words the spline merely shifts position with respect to cooperating mechanism but maintains full engagement therewith at all times. It is apparent that a plurality of grooves 57 may be provided so that various adjustments in position may be accomplished by manipulation of the column prior to moving lever 36 to locking position.

It will be apparent, therefore, that when the locking lever 36 is moved to a lowered position in the slot 38 that the wheel is free to be pivoted on its ball supported hub with respect to the steering column and similarly the steering column may be depressed inwardly to a position remote from the driver. This position, with respect to the dashboard, is shown in Figure 10, while the driving position is shown in Figure 8, and the initial releasing position is shown in Figure 9. The sequence of operation for releasing the wheel is normally to shift the lever 36 to the lower position in the slot 38 whereupon the wheel 20 pivots as shown in Figure 7. The driver then presses the steering column toward the dashboard whereby the wheel and column assume the position shown in Figure 5.

From the foregoing it is manifest that I have provided a new combination of steering wheel and steering column wherein the wheel is tiltable in one plane with respect to the steering column and wherein the steering column is adjustable with respect to its length within predetermined limits, said combination including a locking means which is effective to lock the wheel against tilting and to lock the steering column in one of its predetermined positions and which when moved to another position permits tilting of the wheel and adjustment of the steering column.

It is also apparent that the length of the steering column may be adjusted by similar procedures wherein more than one groove 57 may be provided as shown.

While the foreging description has been directed specifically to the embodiment shown in the drawings, it is apparent that the same conditions of operation and locking may be accomplished through the use of a single lug 32 and a single cooperating groove 30. Similarly if it is desired to have the wheel tiltable in all directions rather than in one plane only, this can be accomplished by having the lugs rotatably mounted in the hub member 22. In this connection it is apparent that the same locking facilities will be effective, namely, when the socket 34 is brought into contact with the ball 26 and 22 the wheel will be non-tiltable and locked in a given position with respect to the steering column.

The horn blowing arrangement shown in the drawings forms the subject matter of a concurrently filed application assigned to the assignee of this application, now Patent 2,786,108.

While the foregoing description has been directed specherein disclosed constitute preferred forms, it is to be understood that other forms might be adopted, as may come within the scope of the claims which follow.

What is claimed is as follows:

1. An adjustable steering wheel assembly comprising in combination; a steering column having a generally spherically shaped end portion fixedly attached thereon a peripheral track in the outer surface of said end portion, said track being parallel to the axis of the column, a steering wheel having a hub portion adapted to fit over said spherical portion and including a lug thereon which is adapted to ride in said track whereby the wheel is non-rotatable and tiltable with respect to the steering column, a locking device mounted on said steering column and including a generally hemispherical socket member at one end thereof adjacent said wheel, said locking means being movable from a position remote from said wheel to a position wherein said socket engages at least a portion of said wheel and embraces coextensively a portion of said spherically shaped end portion of the steering column, said locking means in the remote position being ineffective to prevent tilting of the wheel and in the other position being effective to prevent tilting of the wheel with respect to said steering column.

2. An adjustable steering wheel assembly comprising in combination; a steering column having a generally spherically shaped end portion fixedly attached thereon opposed peripheral tracks in the surface of said end portion, said tracks being parallel to the axis of the column, a steering wheel having a hub portion adapted to fit over the upper half of said spherical portion and including a pair of opposed lugs rotatably mounted therein which are adapted to ride in said tracks whereby the wheel is non-rotatable and tiltable with respect to the steering column as limited by the movement of said lugs in said tracks and hub, a locking device mounted on said steering column and including a generally hemispherical socket member at one end thereof adjacent said wheel, said locking means being movable from a position remote from said wheel to a position wherein a portion of said socket engages a portion of said wheel hub and said socket member substantially fits over the lower half of the spherical portion of the steering column, said locking means in the remote position being ineffective to prevent tilting of the wheel and in the other position being effective to prevent tilting of the wheel with respect to said steering column, and a lever associated with said locking means for moving the locking means from one position to the other position.

3. An adjustable steering wheel assembly comprising in combination; a steering column, a steering wheel hingedly and non-rotatably mounted on said steering column at one end thereof and freely tiltable with respect thereto, locking means movable to extreme upper and lower positions and effective in the said upper position to lock the wheel and prevent tilting thereof and in the lower position to free the wheel to permit tilting thereof, said steering column including a tapering annular groove therearound spaced remote from said steering wheel, a pair of concentric sleeves surrounding a portion of said column the outer one of which includes a plurality of spaced annular grooves therearound which face the other sleeve, said other sleeve including at least one aperture therethrough which connects the surface of the steering column to one of the grooves in the first mentioned sleeve, a ball carried between the sleeves and having a portion contained in one of said concentric grooves and another portion contained in said aperture for locking the sleeves together so as to prevent axial movement thereof, spring means for resiliently resisting axial movement of the steering column, said locking means when in said lower position causing the annular groove in said steering column to be moved against the spring means into alignment with the aperture in one of said sleeves whereby the ball moves inwardly into said annular groove to unlock the two sleeves whereby the effective length of the steering column may be varied, said ball upon release of the column being cammed back into engagement between said two sleeves by the spring for again locking the sleeves together through the aperture and any selected annular groove in said one sleeve, said column being locked against axial movement when the locking means are in said upper position.

References Cited in the file of this patent

UNITED STATES PATENTS

| | | |
|---|---|---|
| 504,633 | Squires | Sept. 5, 1893 |
| 1,226,411 | Thomas | May 15, 1917 |
| 1,269,341 | Vincent | June 11, 1918 |
| 1,420,446 | Rostetter | June 20, 1922 |
| 1,709,839 | Chittenden et al. | Apr. 23, 1929 |
| 1,888,728 | Johnson | Nov. 22, 1932 |
| 2,106,870 | Floss | Feb. 1, 1938 |
| 2,127,171 | Hawthorn | Aug. 16, 1938 |
| 2,518,175 | Pinardi | Aug. 8, 1950 |
| 2,744,419 | Chayne | May 8, 1956 |
| 2,792,719 | Lanzone | May 21, 1957 |

FOREIGN PATENTS

| | | |
|---|---|---|
| 91,527 | Austria | Mar. 10, 1923 |
| 569,050 | France | Jan. 3, 1924 |